Figure 1:
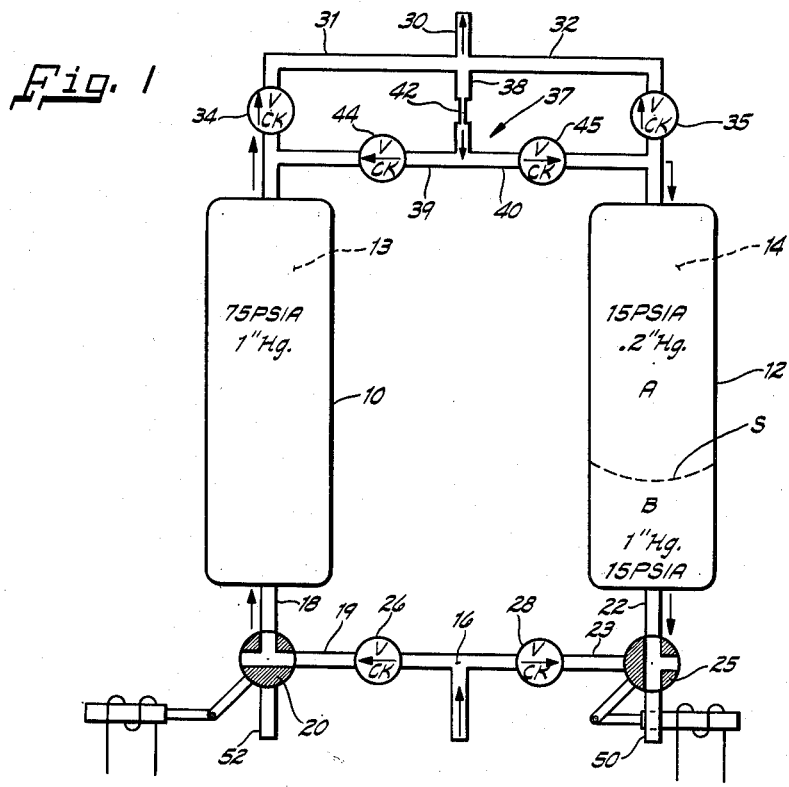

June 1, 1965

H. E. ZANKEY 3,186,150

APPARATUS FOR THE TREATMENT OF GASES

Filed Oct. 1, 1962

3 Sheets-Sheet 1

INVENTOR.
Harry E. Zankey
BY Fred Wiviott
Attorney

INVENTOR.
Harry E. Zankey
BY Fred Wiviott
Attorney

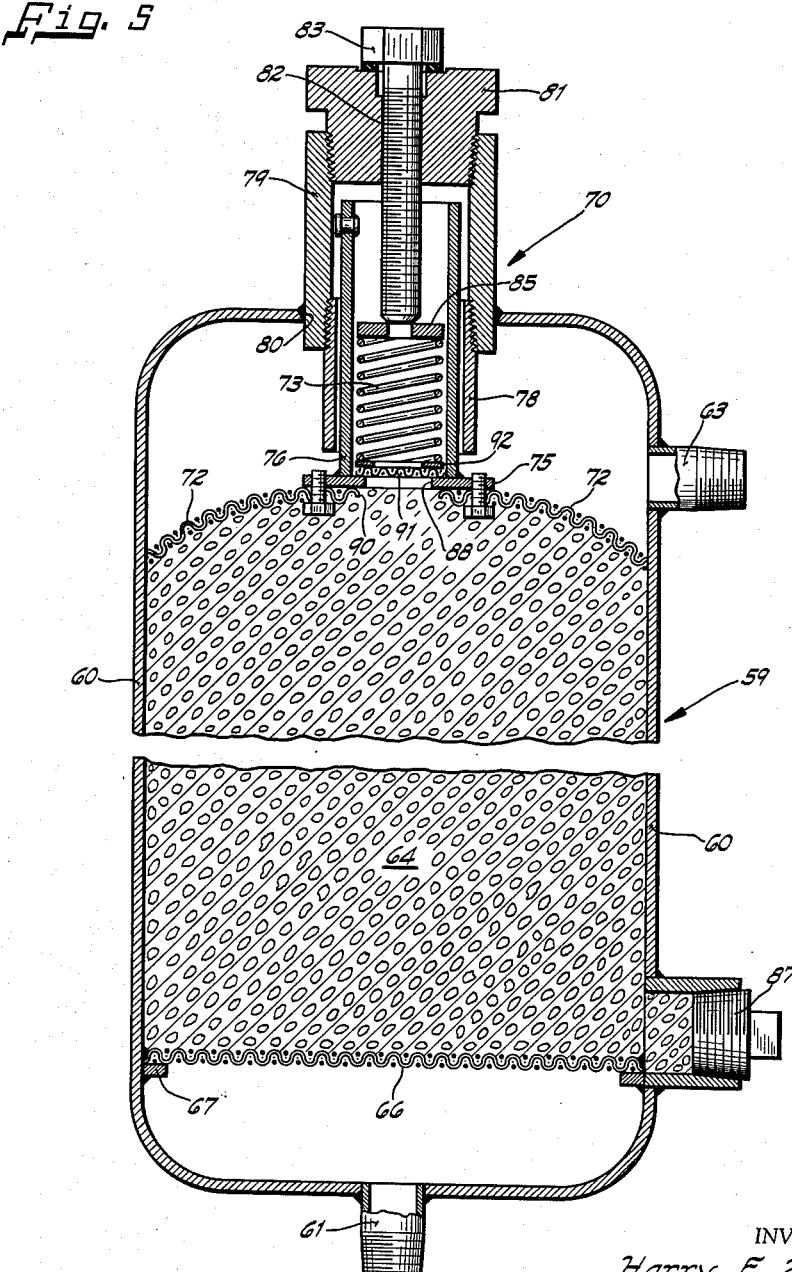

though, 3,186,150
APPARATUS FOR THE TREATMENT OF GASES
Harry E. Zankey, Pittsburgh, Pa., assignor to McGraw-Edison Company, Milwaukee, Wis., a corporation of Delaware
Filed Oct. 1, 1962, Ser. No. 227,486
2 Claims. (Cl. 55—387)

This invention relates to apparatus for the treatment of gases and more particularly to apparatus for removing one or more of the key components from a gaseous mixture or gas stream containing such components, such as for example, the removal of water vapor from an air stream.

Apparatus for the drying or purifying of a gas stream by general method of contacting it with an adsorptive material, such as activated alumina, is well known. In systems of this type, the gas to be treated is passed for a period of time through an adsorber unit until the adsorptive material reaches the limits of its desired degree of contamination whereupon the flow of gas to be treated is stopped and the unit is then reactivated. In order to provide for continuous operation, a pair of adsorption chambers are employed, one of which is in use while the other being reactivated.

One type of gas treating apparatus takes advantage of two basic phenomena. The first is that all desiccants seek to establish equilibrium with their different environment, due to a vapor pressure difference in either direction. Thus, an activated desiccant, that is, one with a low water-vapor pressure, will adsorb water vapor on its active surface from a higher water-vapor pressure environment, and conversely, a water saturated desiccant will give up water vapor to a lower water-vapor pressure atmosphere. In other words, the vapor pressure of the moisture retained by the desiccant will tend to equalize that of the air stream passing through the desiccant. For example, if an air stream having a vapor pressure of 1″ Hg is passed through a desiccant whose retained moisture has a vapor pressure of .2″ Hg, then the desiccant will begin removing moisture from the air stream until the vapor pressure of its retained moisture equals 1″ Hg. On the other hand, if the desiccant's retained moisture vapor pressure is equal to 1″ Hg and and air stream having a vapor pressure of .2″ Hg is passed through it, then the desiccant will give up moisture to the air stream until its moisture has a vapor pressure of .2″ Hg.

The second phenomenon is that the expansion of a compressed gas reduces the pressure of all constituents in proportion to the ratio of absolute pressure change. Thus, where a gas at 75 p.s.i.a. and having a water-vapor pressure of 1″ Hg is reduced to a pressure of 15 p.s.i.a., its water-vapor pressure is also reduced by a 5 to 1 ratio or to .2″ Hg.

By conducting the gas to be treated in a first direction through one adsorption chamber, drawing off a portion of the gas at its outlet, reducing its pressure and passing it through the other chamber in the opposite direction, and then after a relatively short interval reversing this process, a vapor pressure gradient can be established in each of the chambers. These vapor-pressure gradients are employed for drying the air stream through one chamber during adsorption and are re-established in the other chamber during re-activation. Air drying by this method requires relatively frequent changes in the direction of air flow through each of the chambers.

The desiccant in such adsorption chambers generally comprise granules such as, for example, activated alumina of ¼–8 mesh size. In addition, the adsorption chambers are generally disposed vertically with the gas stream passing in one direction during the adsorption cycle and in the other direction during its re-activation cycle. As a result of this relatively frequent reversal of gas flow, the desiccant is violently agitated. Agitation of the desiccant may also occur during build up and bleed down of pressure which occurs with each reversal of adsorbers. The resultant interaction between the desiccant particles causes small pieces to break off and be carried through the retaining screens. This not only diminishes the quantity of desiccant available but also contaminates the gas being treated. Also, as the desiccant is lost and the amount remaining in the chamber decreases, the room available for violent movement of the particles increases thereby further increasing tendency for the total desiccant to be depleted. As a result, prior art gas treating apparatus of the type under discussion requires frequent replenishment of the desiccant particles.

It is an object of the invention to provide gas treating apparatus with means for preventing violent agitation of desiccant particles when the gas flow is in opposition to the pull of gravity.

Another object of the invention is to provide a desiccant type gas treating device with means for holding the desiccant granules in compressive relation to prevent violent movements of the individual particles when subjected to a gas stream.

These and other objects and advantages of the instant invention will become more apparent from the detailed description thereof taken with the accompanying drawing in which:

FIGS. 1, 2, 3 and 4 schematically illustrate the operation of a gas treating apparatus in which the instant invention is incorporated; and FIG. 5 shows a cross sectional view of an adsorption chamber incorporating the instant invention.

Referring to the drawings in greater detail, FIG. 1 schematically illustrates the gas treating apparatus in which the instant invention is incorporated to include a pair of adsorber vessels 10 and 12 each of which includes adsorbent particles 13 and 14, respectively, such as activated alumina. A conduit system is shown connected to each of the vessels 10 and 12 to provide for the passage of treated and non-treated gases therethrough. This system is shown to include a conduit 18 in communication with the lower end of the vessel 10 and which is connected to one branch 19 of an inlet manifold 16 through a three-way solenoid valve 20. Similarly, a conduit 22, in communication with the lower end of vessel 12, is connected to a second branch 23 of inlet manifold 16 through a second three-way solenoid operated valve 25. Check valves 26 and 28, disposed in conduits 19 and 23, respectively, insure one way flow from the manifold 16 to the vessels 10 and 12.

The conduit system also includes an outlet manifold 30 having a first branch 31 in communication with the upper end of the chamber 10 and a second branch 32 in communication with the upper end of the chamber 12. Check valves 34 and 35 in the branches 31 and 32, respectively, insure one way flow between the vessels 10 and 12 and the outlet manifold 30.

In addition, the conduit system also includes a return manifold 37 having a central branch 38 connected to the outlet manifold 30 and branches 39 and 40, respectively, connected to the upper ends of the vessels 10 and 12. A pressure reducing orifice is disposed in the central branch 38 of the return manifold 37 and has its upstream end in communication with the manifold 30 and its downstream end in communication with the branches 39 and 40. Check valves 44 and 45 are disposed in branch conduits 39 and 40, respectively, to insure one way flow from the downstream end of the orifice 42 to the vessels 10 and 12.

FIG. 1 illustrates the state of the apparatus during the initial stage of cyclical operation. Here it can be seen that solenoid valve 20 is in a position which connects the lower end of the chamber 10 to the inlet manifold 16 while the solenoid valve 25 is in a position which connects the lower end of the vessel 12 to a discharge conduit 50. Assume for the sake of illustration that the gas to be treated is initially at a pressure of 75 p.s.i.a. and has a moisture vapor pressure of 1″ Hg. In addition, assume that the water vapor of the desiccants 13 and 14 also initially has a vapor pressure 1″ Hg and that the orifice 42 has a reducing ratio of 5 to 1.

Under these conditions of operation the pressure within chamber 10 will be 75 p.s.i.a. and the desiccant 13 disposed therein will have a water-vapor pressure of 1″ Hg.

Because of the action of the orifice 42, the gas entering the upper end of the vessel 12 will have its pressure, and hence, its vapor pressure, reduced by a factor of 5 relative to that in the outlet manifold 30. In other words, the gas entering the upper end of vessel 12 will be at a pressure of 15 p.s.i.a. and have a vapor pressure of .2″ Hg. As this gas enters the upper end of the vessel 12 it comes into contact with a desiccant having a retained moisture vapor pressure of 1″ Hg so that the desiccant in the upper end of the chamber gives up moisture in an attempt to gain equilibrium with the gas passing through it. As the flow of gas continues, a vapor pressure front S moves downwardly in the vessel 12 leaving a zone A above it having a vapor pressure of .2″ Hg and a zone B below it having a vapor pressure of 1″ Hg.

Figure 2:
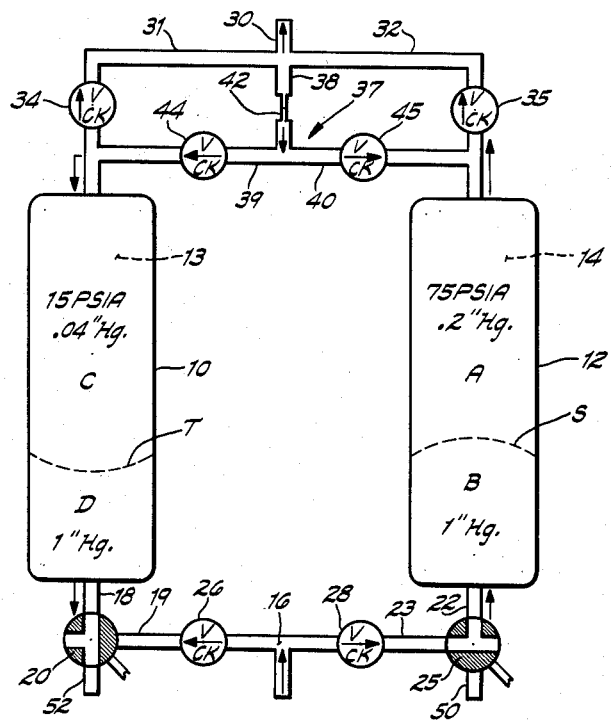

When the desiccants 13 and 14 in chambers 10 and 12, respectively, are in their conditions shown in FIG. 1 the solenoid valves 20 and 25 are each reversed as shown in FIG. 2 so that the lower end of vessel 14 is connected to the inlet manifold 16 and the lower end of vessel 10 is connected to a discharge conduit 52. This will make the pressure within chamber 12 equal to 75 p.s.i.a. while the gas entering its lower end will have a moisture vapor pressure of 1″ Hg. As this gas comes in contact with the desiccant in zone A, which has a moisture vapor pressure of .2″ Hg, this gas will give up moisture to the desiccant so that a vapor pressure front S will begin moving upwardly in the vessel 12 and the gas discharging from its upper end will have a vapor pressure of .2″ Hg. On the other hand, because of the action of the orifice 42 in reducing the pressure and moisture vapor pressure by a ratio of 5 to 1, the gas entering the upper end of the vessel 10 will have a pressure of 15 p.s.i.a. and a moisture vapor pressure of .04″ Hg. This gas will encounter the desiccant 13 having a moisture vapor pressure of 1″ Hg so that the desiccant will give up moisture to the gas causing a vapor pressure front T to begin moving downwardly in the vessel 10 creating a zone C having a vapor pressure of .04″ Hg and a zone D having a vapor pressure of 1″ Hg.

When the desiccants 13 and 14 in the vessels 10 and 12, respectively, are in their conditions shown in FIG. 2, solenoid valves 20 and 25 are again reversed so that the interior of vessel 10 will be at 75 p.s.i.a. and the gas entering its lower end will have a vapor pressure of 1″ Hg. As this gas contacts the desiccant in zone C it will give up moisture so that a vapor pressure front T will begin moving upwardly in the vessel and the gas discharging from the upper end will have a vapor pressure .04″ Hg. The orifice 42 will reduce this vapor pressure to .008″ Hg at the upper end of vessel 12 so that when this gas comes in contact with the .2″ Hg desiccant in zone A, a second vapor pressure front U will begin moving downwardly in the vessel 12.

Figure 3:
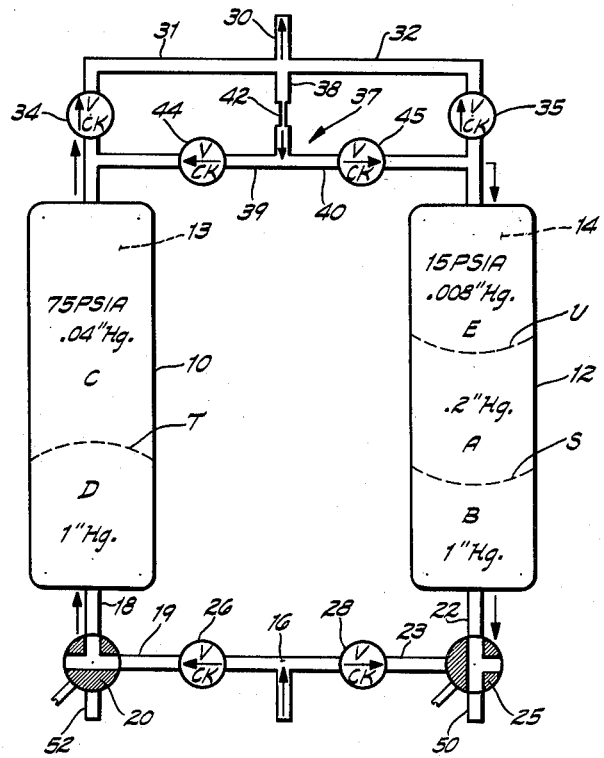
Figure 4:
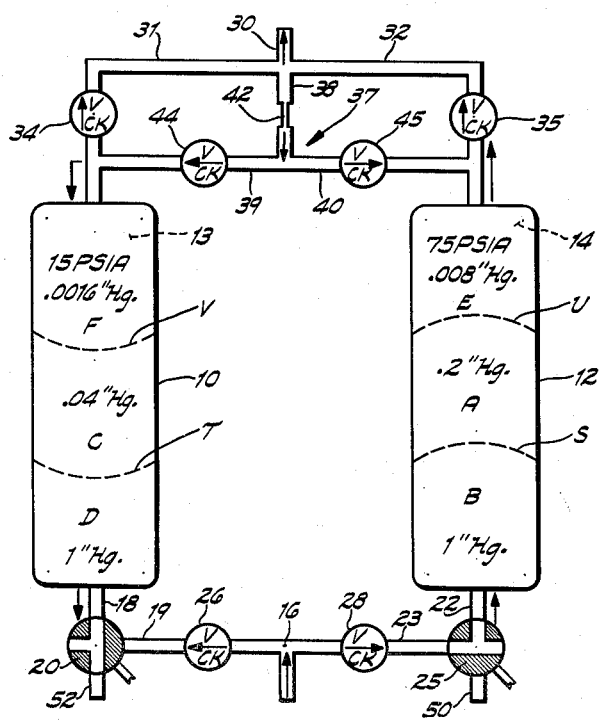

When a desiccant in the vessels 10 and 12 are in the condition shown in FIG. 3, the solenoid valves 20 and 25 are again reversed so that the gas being treated will discharge from the upper end of the vessel 12 with a vapor pressure of .008″ Hg as a result of its contact with the desiccant in zone E and the vapor pressure front U will move upwardly through said vessel. As a result of the action of the orifice 42 the gas entering the upper end of the chamber 10 will have a gas vapor pressure of .0016″ Hg. The passage of this gas over the desiccant in zone C will remove vapor from said desiccant so that a moisture vapor pressure front V will begin moving downwardly in the vessel 10.

These cyclical operations will continue until the vapor pressure fronts merge and there is created at the upper end of each of the vessels 10 and 12 a zone of desiccant having a relatively low vapor pressure so that the gas discharging from said vessel will have the same low vapor pressure. In addition, after a relatively large number of such cycles, the vapor pressure of the desiccant in each of these upper zones will be substantially the same. It will also be appreciated that the vapor pressure front in each vessel will move upwardly during an adsorption cycle and downwardly during a re-activating cycle. This cycling between the vessels 10 and 12 will be relatively rapid, in the order of a relatively few minutes for each cycle. It will be appreciated, therefore, that the desiccant in each of the vessels will be subjected to a great deal of agitation as the cycles are reversed.

FIG. 5 illustrates an adsorption vessel according to the instant invention in which the loss of desiccant resulting from the reversal of gas flow during the cyclical operations is prevented. This vessel is shown to include an outer cylindrical shell 60 having an inlet nipple 61 in communication with its lower end and an outlet nipple 63 in communication with its upper end. The desiccant 64 is shown to be supported on a screen 66 whose mesh size is smaller than that of the desiccant particle 64 and which is affixed at its periphery to the lower end of the vessel 60. To accomplish this purpose the screen 66 may be suitably affixed to a ring 67 which is affixed to the walls of the vessel 60 in any convenient manner, such as by welding.

In order to prevent any upward movement of the desiccant 64 when the chamber 59 is switched from its re-activating cycle to its adsorption cycle, a pressure assembly 70 is provided at the upper end of the vessel 60.

The pressure assembly 70 is shown to include a screen 72 which also has a mesh size smaller than that of the desiccant 64 and which is urged into high pressure engagement with the upper portion of the body of desiccant 64 by a pressure spring 73.

The screen 72 is shown to have a spherical configuration, although it may have any convenient shape consistent with strength. The central portion of the screen 72 is affixed to a ring 75 which is carried at the lower end of a cylindrical sleeve 76. Sleeve 76 extends upwardly through a guide bushing 78 affixed to the lower end of a collar 79 that is affixed in an aperture 80 in the upper end of the vessel 60 and extends outwardly therefrom.

A plug 81 is threadably received at the upper end of the collar 79 and has a central threaded aperture 82 for receiving an adjusting bolt 83. The lower end of adjusting bolt 83 engages a washer 85 that bears against the upper end of the pressure spring 73 and thereby urges the plate 75 and the screen 72 downwardly into high pressure engagement with the desiccant particles 64.

It can be seen that the screen 72 transmits the pressure of the spring 73 to the entire upper area of the desiccant body 64 and prevents any upward displacement of these particles during an adsorption cycle. It can be seen too that the inlet nipple 61 is below the screen 66 and the outlet nipple 63 is above the screen 72 to prevent the loss of any particles into the gas stream. A threaded plug 87 is provided in the lower end of the vessel 60 above the screen 66 so that the desiccant 64 may be removed from between the screens 66 and 72. In addition, central apertures 88 and 90 are provided in the ring 75 and the screen 72, respectively, so that upon removal of the plug 81, the washer 85 and the spring 73, desiccant can be added to the interior of the vessel 60. In order to prevent the escape of any desiccant through apertures 88 and 90 a small screen 91 which is affixed to a ring 92, is disposed between the spring 73 and the ring 75.

With the pressure assembly 70, as shown in FIG. 5, any upward displacement of the desiccant 64 during an adsorption cycle is prevented. As a result of the elimination of such violent movements of the desiccant particles, desiccant loss is substantially reduced so that the number of cycles possible without adding desiccant is greatly increased.

While only a single embodiment has been shown and described is not intended that the invention be limited thereby but only by the scope of the appended claims.

I claim:

1. Apparatus for the treatment of gases, comprising a vertically disposed, generally cylindrical vessel, a quantity of adsorbent particles disposed in said vessel, a first screen means fixedly mounted adjacent the lower end of said vessel and co-extensive with the cross-section thereof to support said adsorbent particles, a second screen means movably disposed in the upper end of said vessel, said second screen means having a spherical configuration and being co-extensive with the cross-section of said vessel, said second screen means having a central aperture, said cylinder having an opening in the upper end thereof, bushing means surrounding said opening, sleeve means slidably mounted in said bushing means and coupled to said second screen means around the aperture therein, removable closure means over the opening in said second screen means, cap means covering the outer end of said bushing means, spring means disposed in said sleeve means and engaging the upper end of said second screen means, and means coupled to said cap means for compressing said spring means whereby said second screen means is resiliently urged into high-pressure engagement with said adsorbent particles to compress said particles between said first and second screen means to prevent displacement thereof upon the reversal of the direction of gas flow in said vessel.

2. Apparatus for the treatment of gases comprising a vessel, a quantity of adsorbent particles disposed in said vessel, a first screen means fixedly mounted adjacent one end of said vessel and coextensive with the cross-section thereof to support said adsorbent particles, a second screen means movably disposed in the other end of said vessel, said second screen means being coextensive with the cross-section of said vessel and having a central aperture, said vessel having an opening in the other end thereof, bushing means surrounding said opening, sleeve means slidably mounted in said bushing means and coupled to said second screen means around the aperture therein, removable closure means covering the outer end of said bushing means, spring means disposed in said sleeve means and engaging said second screen means, and means coupled to said removable closure means for compressing said second screen means whereby said second screen means is resiliently urged into high-pressure engagement with said adsorbent particles to compress said particles between said first and second screen means to prevent displacement upon the reversal of the direction of gas flow in said vessel.

References Cited by the Examiner
UNITED STATES PATENTS

| | | | |
|---|---|---|---|
| 1,990,657 | 2/35 | Krieck | 55—475 |
| 2,283,989 | 5/42 | Henry | 55—387 |
| 2,586,670 | 2/52 | Lambertsen | 55—387 |
| 2,758,719 | 8/56 | Line | 55—387 X |
| 2,944,627 | 7/60 | Skarstrom | 55—62 |
| 2,955,673 | 10/60 | Kennedy et al. | 55—62 X |
| 2,979,828 | 4/61 | Westeren | 55—179 |

REUBEN FRIEDMAN, *Primary Examiner.*

HARRY L. MARTIN, *Examiner.*